(12) United States Patent  (10) Patent No.: US 9,103,414 B1
Goleski et al.  (45) Date of Patent: Aug. 11, 2015

(54) SIX SHIFT-ELEMENT STEP-RATIO AUTOMATIC TRANSMISSION

(71) Applicant: FORD GLOBAL TECHNOLOGIES, LLC, Dearborn, MI (US)

(72) Inventors: Gregory Daniel Goleski, Rochester Hill, MI (US); Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/282,146

(22) Filed: May 20, 2014

(51) Int. Cl.
*F16H 3/62* (2006.01)
*F16H 3/44* (2006.01)

(52) U.S. Cl.
CPC ............ *F16H 3/62* (2013.01); *F16H 2003/445* (2013.01); *F16H 2200/0065* (2013.01); *F16H 2200/0082* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 6,176,803 B1 * | 1/2001 | Meyer et al. | 475/286 |
| 7,276,011 B2 | 10/2007 | Tabata et al. | |
| 7,452,303 B2 | 11/2008 | Seo | |
| 7,488,269 B2 | 2/2009 | Tabata et al. | |
| 7,892,136 B2 | 2/2011 | Kim | |
| 7,980,988 B2 | 7/2011 | Phillips et al. | |
| 8,210,981 B2 | 7/2012 | Bauknecht et al. | |
| 8,231,495 B2 | 7/2012 | Gumpoltsberger et al. | |
| 8,231,501 B2 | 7/2012 | Gumpoltsberger et al. | |
| 8,241,170 B2 | 8/2012 | Gumpoltsberger et al. | |
| 8,241,171 B2 | 8/2012 | Gumpoltsberger et al. | |
| 8,251,859 B2 | 8/2012 | Gumpoltsberger et al. | |
| 8,425,370 B2 | 4/2013 | Leesch et al. | |
| 8,444,524 B2 | 5/2013 | Gumpoltsberger et al. | |
| 8,485,934 B2 | 7/2013 | Gumpoltsberger et al. | |
| 9,011,289 B2 * | 4/2015 | Goleski et al. | 475/277 |
| 2012/0186376 A1 | 7/2012 | Ziemer et al. | |
| 2013/0231215 A1 * | 9/2013 | Coffey et al. | 475/276 |
| 2014/0141925 A1 * | 5/2014 | Hart et al. | 475/276 |

FOREIGN PATENT DOCUMENTS

DE 102009028734 A1 * 2/2011 ............... F16H 3/66

* cited by examiner

*Primary Examiner* — Dirk Wright
(74) *Attorney, Agent, or Firm* — James Dottavio; Brooks Kushman P.C.

(57) ABSTRACT

A nine speed transmission having six shift-elements. An input being selectively coupled with an interior-gear capable of being braked and an end-gear from a first gearing-arrangement and coupled with an interior-gear of a fourth gearing-arrangement. An opposite end-gear from the first gearing-arrangement being fixedly coupled with an interior-gear of a second gearing-arrangement. An end-gear of a third gearing-arrangement being a ground or capable of being braked. An output being coupled with an interior-gear from the third gearing arrangement and an end-gear from the fourth gearing-arrangement. An end-gear of the second gearing-arrangement being a ground and the opposite end-gear being coupled with opposite end-gears from the third and fourth gearing-arrangements. The opposite end-gear of the second gearing-arrangement also being selectively coupled to the interior-gear of the first gearing-arrangement. Coupled, as used here, may mean selectively or fixedly coupled.

22 Claims, 2 Drawing Sheets

FIG. 1

| | S1 | S2 | S3 | S4 | S5 | S6 | Ratio | Step |
|---|---|---|---|---|---|---|---|---|
| Rev | | X | X | | X | | -4.930 | |
| 1st | | X | | X | X | | 5.503 | |
| 2nd | X | | | X | X | | 3.333 | 1.65 |
| 3rd | X | X | | | X | | 2.315 | 1.44 |
| 4th | | X | | | X | X | 1.661 | 1.39 |
| 5th | X | X | | | | X | 1.211 | 1.37 |
| 6th | X | | | X | | X | 1.000 | 1.21 |
| 7th | | X | | X | | X | 0.865 | 1.16 |
| 8th | | | X | X | | X | 0.717 | 1.21 |
| 9th | | X | X | | | X | 0.601 | 1.19 |

Betas: GA-1: 2.130  GA-2: 2.272  GA-3: 2.333  GA-4: 2.528

SIX SHIFT-ELEMENT STEP-RATIO AUTOMATIC TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed to run at a quieter, more fuel efficient cruising speed. Typically, a transmission has a housing mounted to the vehicle structure, an input-shaft driven by an engine crankshaft through a clutch or torque converter, and an output-shaft driving the vehicle wheels, often via a differential assembly which permits the left and right wheel to rotate at slightly different speeds as the vehicle turns.

An automatic transmission, also called an automatic gearbox, is a type of motor vehicle transmission that can automatically change gear ratios as the vehicle moves, freeing the driver from having to shift gears manually. Most automatic transmissions have a defined set of gear ranges, or step-ratios. Typically varying gear-elements of compound epicyclic planetary-gearsets are coupled together by varying shift-elements within the transmission to provide the step-ratios. The shift-elements may be actuated by hydraulic servos controlled by a valve body. Hydraulic fluid, or automatic transmission fluid, may be used to actuate and engage the shift-elements.

SUMMARY

One aspect of this disclosure is directed to a six shift-element transmission. The six shift-element transmission has a first planetary-gearset having a first carrier and a first sun selectively coupled to an input by first and second shift-elements, respectively. The first planetary-gearset also has a first ring. The transmission has a second planetary-gearset having a second carrier and a second sun fixedly coupled to the first ring and a housing, respectively. The second planetary-gearset also has a second ring. This transmission also has a third and a fourth planetary-gearset each having a gear-element coupled to the second ring.

The transmission may include a third shift-element that selectively couples the first carrier to the housing. The transmission may also include a fourth shift-element that selectively couples the first carrier to the second ring.

The gear-element of the third planetary-gearset that is coupled to the second ring may be a third sun. The third planetary-gearset may also include a third carrier coupled to an output, and a third ring coupled to the housing. The third sun may be fixedly coupled to the second ring. The third carrier may be fixedly coupled to the output. A fifth shift-element may selectively couple the third ring to the housing.

The gear-element of the fourth planetary-gearset that is coupled to the second ring may be a fourth sun. The fourth planetary-gearset may include a fourth carrier coupled to the input, and a fourth ring coupled to the output. The fourth sun may be fixedly coupled to the second ring. The fourth carrier may be fixedly coupled to the input. A sixth shift-element may selectively couple the fourth ring to the output.

Another aspect of this disclosure is directed toward a transmission having a first and second planetary-gearset. In this transmission, the first planetary-gearset has a first interior-gear selectively coupled to an input and selectively coupled to a housing, a first end-gear selectively coupled to the input, and a second end-gear. The second planetary-gearset has a second interior-gear fixedly coupled to the second end-gear, a third end-gear fixedly coupled to the housing, and a fourth end-gear selectively coupled to the first interior-gear.

The first interior-gear may be a first carrier, the first end-gear may be a first sun, and the second end-gear may be a first ring. The second interior-gear may be a second carrier, the third end-gear may be a second sun, and the fourth end-gear may be a second ring.

The transmission may also include a third planetary-gearset having a fifth-end gear coupled to the fourth end-gear. The fifth end-gear may be a third sun fixedly coupled to the fourth end-gear. The third planetary-gearset may also have a third interior-gear coupled to an output. The third interior-gear may be a third carrier fixedly coupled to the output. The third planetary-gearset may have a sixth end-gear coupled to the housing. The sixth end-gear may be a third ring selectively coupled to the housing.

The transmission may include a fourth planetary-gearset having a seventh end-gear coupled to the fourth end-gear. The seventh end-gear may be a fourth sun fixedly coupled to the fourth end-gear. The fourth planetary-gearset may also have a fourth interior-gear coupled to the input. The fourth interior-gear may be a fourth carrier fixedly coupled to the input. The fourth planetary-gearset may have an eighth end-gear coupled to the output. The eighth end-gear may be a fourth ring selectively coupled to the output.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
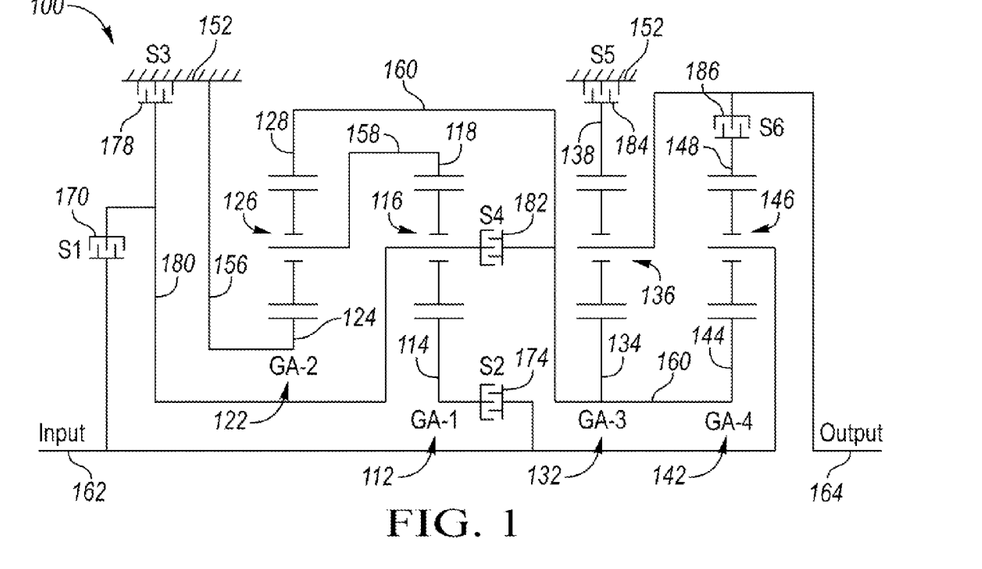
FIG. 1 is a schematic diagram of a first transmission.

FIG. 1 shows a schematic diagram of a first transmission 100. The schematic diagraming of a transmission may also be referred to as a stick diagram and the lines on the stick diagram may represent gearing-arrangements made up of gear-elements, shafts associated with the gear-elements, and the interconnection of the shafts with other shafts, gear-elements, or a transmission housing. A shaft may be any physical object used to transfer movement (or hold movement) of an associated gear-element to another location, or to move (or hold) an associated gear-element in response to the shaft receiving that motion (or non-motion) from another location.

A gearing-arrangement is a collection of meshing gear-elements configured to impose specified speed relationships among the gear-elements. The speed relationships among the gear-elements may be determined by the number of teeth of the respective gear-elements. A linear speed relationship (LSR) exists among an ordered list of gear-elements when i) the first and last gear-element in the group are constrained to have the most extreme speeds, ii) the speeds of the remaining gear-elements are each constrained to be a weighted average of the first and last gear-element, and iii) when the speeds of the gear-elements differ, they are constrained to be in the listed order, either increasing or decreasing. A discrete ratio or step-ratio transmission has gearing-arrangements that selectively impose a number of discrete speed ratios between an input-shaft and an output-shaft.

A gearing-arrangement may be a planetary-gearset having as gearing-elements at least one planet gear disposed between a sun gear and a ring gear. A planet gear may be simply referred to as a planet, a sun gear may be simply referred to as a sun, and a ring gear may be simply referred to as a ring. In a simple planetary gearset, teeth of the planets mesh with teeth of both the sun and ring simultaneously. The planets are associated with a shaft referred to as a carrier. A simple planetary gearset is a type of gearing-arrangement that imposes a LSR among the sun, the carrier, and the ring. The order of the LSR is from the sun to the carrier to the ring, or vice versa, and thus the linear speed relationship of the associated shafts follow. If the shaft associated with the sun is held with no rotation (braked), then the shaft associated with the ring would have a greater rotational speed than the carrier. Similarly, if the shaft associated with the ring is braked, then the shaft associated with the sun would have a greater rotational speed than the carrier.

A double-pinion planetary-gearset also imposes a LSR between a sun, carrier, and ring, but in a different order from a simple planetary-gearset. In a double-pinion planetary gearset the carrier is associated with at least a pair of planets which are disposed between the sun and the ring. Teeth of the first planet mesh with teeth of the sun (without contacting the ring), teeth of the second planet mesh with teeth of the ring (without contacting the sun), and teeth of both planets mesh with each other. The order of the LSR in a double-pinion planetary-gearset is from the sun to the ring to the carrier. Thus, if the shaft associated with the sun is braked, then the carrier will have a greater rotational speed than the shaft associated with the ring. If the carrier is braked, then the shaft associated with the sun will have a greater rotational speed than the ring.

Following this relationship, a simple planetary-gearset may be replaced with a double-pinion planetary-gearset by swapping shafts from the ring to the carrier (which may also require changing the number of teeth on the respective gear-elements to maintain the same speed relationships). In other words, the linear speed relationship of a gearing-arrangement may be "turned inside-out" by switching from a simple planetary-gearset to a double-pinion planetary-gearset. This interchangeability provides that the extreme speed gear-elements (fastest or slowest in comparison to each other) may be referred to as end-gears, while a gear-element that experience a speed within the extreme speed gear-elements may be referred to as an interior-gear. In the case of a simple planetary-gear set, the sun-gear and the ring-gear would be the end-gears while the carrier would be the interior-gear, whereas in the double-pinion gearing-arrangement, the sun-gear and the carrier would be the end-gears, while the ring-gear would be the interior-gear.

A group of gear-elements are fixedly coupled to one another if they are constrained to rotate as a unit in all operating conditions. The multiple gear-elements would be associated with the same shaft, or one shaft would be considered to be associated with a number of gear-elements. Gear-elements may be fixedly coupled by spline connections, welding, press fitting, machining from a common solid, or other means. Slight variations in rotational displacement between fixedly coupled gear-elements may occur such as displacement due to lash or shaft compliance. A single gear-element fixedly coupled to the transmission housing is constrained such that it does not experience rotation and may be referred to as a ground.

A gear-element or shaft may be selectively coupled to another gear-element, shaft or to the transmission housing by a shift-element when the shift-element constrains them to rotate (or to not rotate) as a unit whenever the shift-element is fully engaged. A shift-element may also be referred to as a clutch. In the case of selectively coupling two gear-elements, they are free to rotate at distinct speeds when the clutch is not fully engaged. The two gear-elements may be considered to be associated with two different shafts regardless of the clutch engagement state. A clutch that holds a gear-element or shaft against rotation by selectively connecting it to structure that does not rotate, such as the transmission housing, may be referred to as a brake. Non-rotating structure, such as the transmission housing, may be referred to as a ground. Clutches may be actively controlled devices such as hydraulically or electrically actuated clutches or brakes or they may be passive devices such as one way clutches or brakes.

Gear-elements said to be coupled together may be either fixedly coupled together or selectively coupled together. For example, a sun of one gearing-arrangement may be coupled to a sun of another gearing-arrangement. In this example, the suns may be fixedly coupled together by sharing the same shaft and as such are constrained to always rotate at the same speed, or they may be selectively coupled together by a shift-element such that the suns may have differing speeds when the shift-element is not fully engaged, and may be constrained to rotate at the same speed when the shift-element is engaged.

The first transmission 100 has a first planetary-gearset 112, also referred to a first gearing-arrangement (GA-1). The first planetary-gearset 112 has gear-elements such as a first sun 114, a first carrier 116, and a first ring 118. The first planetary-gearset 112 is shown as a simple planetary-gearset and as such the first sun 114 may also be referred to as a first end-gear 114. The first carrier 116 may be referred to as a first interior-gear 116, and the first ring 118 may be referred to as a second end-gear 118. The numerical ordering of gearsets and/or gear-elements in this application does not imply a speed relationship or sequential order; it is merely used to identify one from another and chosen in order of the description. As such, a first end-gear could be a sun, ring or carrier, depending on the gearing-arrangement, and the second end-gear would be the next end-gear to be described.

A second planetary-gearset 122, also referred to a second gearing-arrangement (GA-2), is shown as a simple planetary-gearset having gear-elements of a second sun 124, a second carrier 126, and a second ring 128. The second sun 124 may be referred to as a third end-gear 124, the second carrier 126 may be referred to as a second interior-gear 126, and the second ring 128 may be referred to as a fourth end-gear 128.

A third planetary-gearset 132, also referred to a third gearing-arrangement (GA-3), is shown as a simple planetary-gearset having gear-elements such as a third sun 134, a third carrier 136, and a third ring 138. The third sun 134 may be referred to as a fifth end-gear 134, the third carrier 136 may be referred to as a third interior-gear 136, and the third ring 138 may be referred to as a sixth end-gear 138.

A fourth planetary-gearset 142, also referred to a fourth gearing-arrangement (GA-4), is shown as a simple planetary-gearset having gear-elements such as a fourth sun 144, a fourth carrier 146, and a fourth ring 148. The fourth sun 144 may be referred to as a seventh end-gear 144, the fourth carrier 146 may be referred to as a fourth interior-gear 146, and the fourth ring 148 may be referred to as an eighth end-gear 148.

First transmission 100 has a housing 152, which may also be referred to as a ground 152 (or any shaft fixedly coupled thereto). The housing 152 provides a non-rotating structure that a gear-element may be fixedly or selectively coupled to. A shift-element or clutch may be configured to selectively couple a gear-element and/or shaft to the housing in order to hinder rotation of the gear-element or shaft. A shift-element that couples a gear-element or shaft to a ground is often referred to as a brake.

The second sun 124 is shown fixedly coupled to the ground 152. A first shaft 156 may be used to fixedly couple the second sun 124 to the ground 152. Since the second gearing-arrangement 122 is a simple planetary-gearset, grounding the second sun 124 provides that the any shaft associated with the second ring 128 will have a speed faster than the second carrier 126. As mentioned above, however, the shaft speed correlation may be swapped, such that the ring could be grounded and any shaft associated with the sun would then have a speed faster than the carrier. Thus the associated shaft and the ground could be swapped from a sun to a ring (and the teeth of the gears modified as necessary to maintain the linear speed relationship).

This relationship is further enhanced by the ability to swap out a simple planetary-gearset with a double-pinion planetary-gearset. In that case, the order would be from the sun to the ring to the carrier. Grounding the sun would provide for the carrier to have a faster speed than a shaft associated with the ring and grounding the carrier would provide for a shaft associated with the sun to have a faster speed than a shaft associated with the ring. This ability to swap the gear-elements and planetary-gear types provides that broader terminology may be used to define the relationship, in that the second planetary-gearset 122 has an end-gear (e.g. a third end-gear 124) fixedly coupled to a ground 152.

The second carrier 126 is fixedly coupled to the first ring 118. A second shaft 158 may be used to fixedly couple the second carrier 126 to the first ring 118. It may also be stated that an interior-gear of the second gearing-arrangement 122 (e.g. the second interior-gear 126) is fixedly coupled to the second end-gear 118. The second end-gear 118 shown here as a ring on a simple planetary-gearset, but it could be a carrier on a double-pinion planetary-gearset, or a sun on either a simple or double-pinion planetary-gearset.

The second ring 128 is coupled to the third sun 134 and the fourth sun 144. Coupled, as used here, may indicate either fixedly coupled or selectively coupled. In this case, the second ring 128 is fixedly coupled to the third sun 134 and the fourth sun 144. A third shaft 160 may be used to fixedly couple the second ring 128 to the third sun 134 and to the fourth sun 144. Also, as with above, this relationship could also be described as an end-gear from the second gearing-arrangement 122 (e.g. the fourth end-gear 128) being coupled with an end-gear of the third gearing-arrangement 132 (e.g. the fifth end-gear 134) and an end-gear of the fourth gearing-arrangement 142 (e.g. the seventh end-gear 144).

An input shaft 162, or simply referred to as an input 162, is coupled to the fourth carrier 146. Coupled, as used here, may mean fixedly or selectively coupled. In this figure, the fourth carrier 146 is fixedly coupled to the input 162. This could also be stated as the input 162 being fixedly coupled to an interior-gear of the fourth gearing-arrangement 142 (e.g. the fourth interior-gear 146).

An output shaft 164, or simply referred to as an output 164, is coupled to a gear-element of the third planetary-gearset 132. In this case, the output 164 is fixedly coupled to the third carrier 136. Said another way, the output 164 is fixedly coupled to an interior-gear of the third gearing-arrangement 132 (e.g. the third interior-gear 136).

A first shift-element 170 selectively couples the first carrier 116 with the input 162. Thus when the first shift-element 170 is engaged, the first carrier 116 spins at substantially the same speed as the input 162. Since the first planetary-gearset 112 is a simple planetary-gearset, the first shift-element 170 may be said to selectively couple the input 162 to an interior-gear of the first gearing-arrangement 112 (e.g. the first interior gear 116).

A second shift-element 174 selectively couples the first sun 114 the input 162. Thus engagement of the second shift-element 174 causes the first sun 114 to rotate at substantially the same speed as the input 162. Said another way, the second shift-element 174 selectively couples the input 162 to an end-gear of the first gearing-arrangement 112 (e.g. the first end-gear 114). In this transmission, the input 162 is fixedly coupled to the fourth carrier, thus the second shift-element 174 also selectively couples the first sun 114 with the fourth carrier 146.

A third shift-element 178 selectively couples the first carrier 116 to the ground 152. A fourth shaft 180 may be fixedly coupled to the first carrier 116 and one side of the third shift-element 178. Since the third shift-element 178 selectively couples a shaft to the ground 152, the third shift-element 178 may be referred to as a brake. Stated more broadly, the third shift-element 178 selectively couples an interior-gear of the first gearing-arrangement 112 (e.g. the first interior-gear 116) to the ground 152. Engagement of the third shift-element 178 results in the first carrier 116 remaining stationary and not rotating.

A fourth shift-element 182 selectively couples the first carrier 116 to the second ring 128. Also, the fourth shift-element 182 may selectively couple the third shaft 160 with the fourth shaft 180 and thus any other gear elements associated with those two shafts. Stated more broadly, the fourth shift-element 182 selectively couples an interior-gear of the first gearing-arrangement 112 (e.g. the first interior-gear 116) to an end-gear of the second gearing-arrangement 122 (e.g. the fourth end-gear 128). In this transmission, the fourth shift-element 182 also selectively couples end-gears from the third and fourth gearing-arrangements 132, 142 (e.g. the fifth and seventh end-gears 134, 144) as well. Engagement of the fourth shift-element 182 causes the first carrier 116, the second ring 128, the third sun 134 and the fourth sun 144 to all rotate at substantially the same speed.

A fifth shift-element 184 selectively couples a gear-element of the third planetary-gearset 132 to the ground 152. The fifth shift-element 184 selectively couples the third ring 138 to the ground 152. The fifth shift-element 184 may be referred to as a brake. Said a different way, the fifth shift-element 184 selectively couples an end-gear of the third gearing-arrangement 132 to the ground 152. Engagement of the fifth shift-element 184 results in the third ring 138 remaining stationary and not rotating. Stated more broadly, the fifth shift-element 184 selectively couples an end-gear of the third gearing-arrangement 132 (e.g. the sixth end-gear 138) to the ground 152. Engagement of the fifth shift-element 184 results in one end-gear (e.g. the sixth end-gear 138) being fixed (i.e. having substantially no speed) and the other end-gear (e.g. the fifth end-gear 134) having a speed faster than the interior-gear (e.g. the third interior-gear 136).

A sixth shift-element 186 selectively couples a gear-element from the fourth planetary-gearset 142 to the output 164. The sixth shift-element 186 selectively couples the fourth ring 148 to the output 164. Said another way, the sixth shift-element 186 selectively couples an end-gear of the fourth gearing-arrangement 142 (e.g. the eighth end-gear 148) to the output 164. Engagement of the sixth shift-element 186 results in the output 164 and the fourth ring 148 rotating at substantially the same speed. In this transmission, the sixth shift-element 186 also selectively couples the fourth ring 148 to the third carrier 136. Said another way, the sixth shift-element 186 selectively couples an end-gear of the fourth gearing arrangement 142 (e.g. the eighth end-gear 148) to an interior-gear of the third gearing-arrangement 132 (e.g. the third interior-gear 136).

Figure 2:
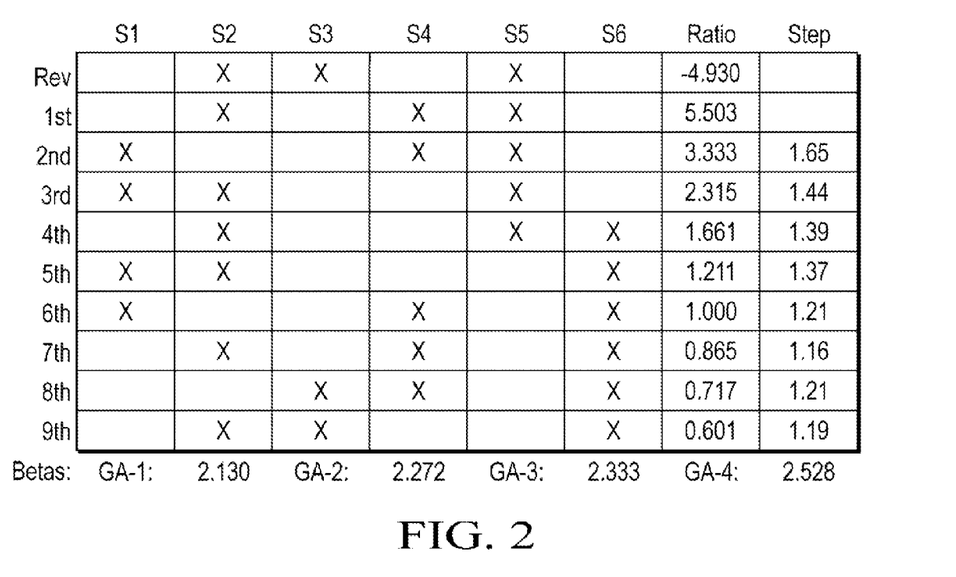
FIG. 2 is a clutch chart for the transmission in FIG. 1.

FIG. 2 illustrates a shift-element engagement chart, also referred to as a clutch chart, for the first transmission 100. The columns represent the respective shift-elements, the speed ratio and the step value, and the rows represent transmissions speeds. An 'X' in a cell indicates that the shift-element of that column is engaged (in combination with others) to establish that speed. An automatic transmission may 'shift gears' from one speed to another by selectively engaging and/or disengaging clutches. The first transmission 100 may have the shift-elements 170, 174, 178, 182, 184, 186 engaged in varying combinations of three to establish nine forward speeds and one reverse speed between the input 162 and the output 164.

Transitioning or 'shifting' between speeds may follow a one-off/one-on disengagement/engagement strategy in which only one of the three clutches is disengaged with a new single clutch being engaged to change to the next speed. For example, the first transmission 100 may start in a first speed by engaging the second, fourth and fifth shift-elements 174, 182, 184. The first transmission 100 may then shift to a second speed by disengaging the second shift-element 174 and engaging the first shift-element 170. Moving from a lower speed to a higher speed may be referred to as up-shifting. Moving from a higher speed to a lower speed may be referred to as down-shifting. Additional speeds may be up-shifted to or down-shifted from following a similar disengagement/engagement strategy.

Although a one-off/one-on disengagement/engagement strategy is shown, multiple clutch disengagements with simultaneous or time spaced multiple clutch engagements may also be used. Multiple clutch disengagements with simultaneous or time spaced multiple clutch engagements may also be used to skip speeds. It is also possible to skip speeds with a one-off/one-on strategy, such as going from $1^{st}$ to $3^{rd}$ or from $6^{th}$ to $8^{th}$. Although the first transmission 100 is shown having nine forward speeds and one reverse speeds available, the transmission 100 may utilize a control strategy that only employs a portion of the available speeds when used on a vehicle.

Beta ratios for the four gearing-arrangements 112, 122, 132, 142 are also shown in FIG. 2. A beta ratio is a ratio between a pitch diameter of a ring-gear to a pitch diameter of a corresponding sun-gear in a planetary-gearset. In order for a planetary-gearset to function properly, the teeth on each gear-element should be of corresponding pitch so as to mesh with one another. Gear-elements having meshable teeth also provide for the beta ratios to be determined by dividing the number of teeth of a ring-gear by the number of teeth of a corresponding sun-gear. The beta ratio for the first planetary-gearset 112 is 2.130, the beta ratio for the second planetary-gearset 122 is 2.272, the beta ratio for the third planetary-gearset 132 is 2.333, and the beta ratio for the fourth planetary-gearset 142 is 2.528. When these beta ratios exist with the planetary-gearsets 112, 122, 132, 142 arranged as shown in FIG. 1 with the shift-elements 170, 174, 178, 182, 184, 186 engaged as shown in FIG. 2, then the speed ratios as shown in the speed ratio column, which are the ratios of the speeds of the input to the speeds of the output, are produced between the input 162 and the output 164.

For example, when the beta ratios of FIG. 2 apply to the first transmission 100, the speed ratio for the first forward speed ratio is 5.503. While the transmission 100 is operating in the first forward speed, the transmission may shift to the second forward speed having a second forward speed ratio of 3.333. Speed ratios may be modified and tuned by changing the beta ratios, which may be done by increasing or decreasing the number of teeth on corresponding sun-gears or ring-gears. When the input 162 rotates at substantially the same speed as the output 164, the transmission provides a 1:1 ratio, as shown by the sixth speed in FIG. 2.

The far right column in FIG. 2 also shows the steps between the speed ratios, which is the previous speed ratio divided by the current speed ratio. The step between the first forward speed ratio and the second forward speed ratio is 1.65 (=5.503/3.333). Smaller speed steps may be desirable for smoother speed transitions. Smaller speed steps may also allow the engine RPM to be controlled more precisely. Smaller speed steps, however, require more speed transitions to occur as a vehicle increases in overall velocity. Larger speed shifts may be employed to allow for less speed transitions to occur. As mentioned above, when employing a three shift-element engagement per speed strategy, nine forward speeds are available, however in use, not all speeds may be employed when the transmission is used on a vehicle.

Figure 3:
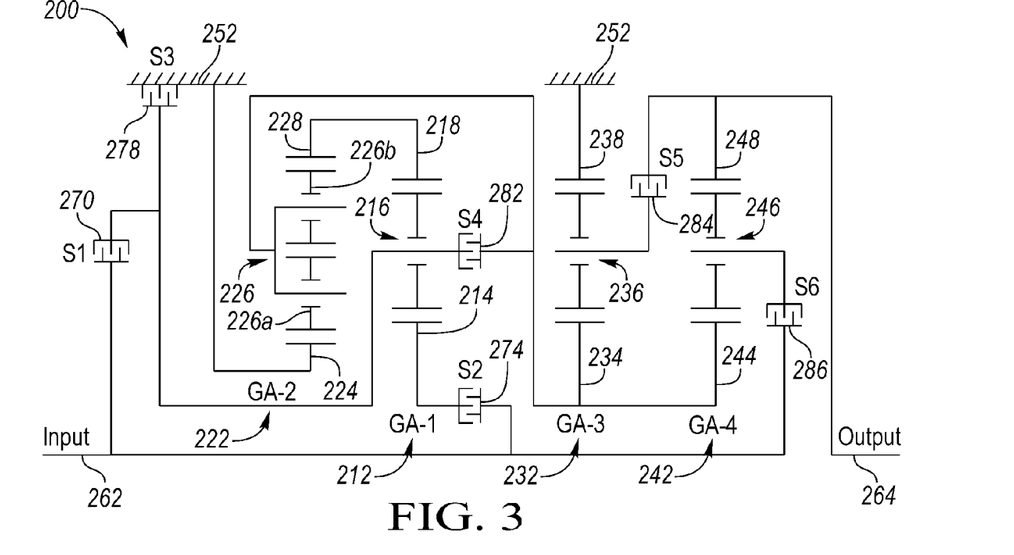
FIG. 3 is a schematic diagram of a second transmission.

FIG. 3 shows a schematic diagram of a second transmission 200. Second transmission 200 has a first gearing-arrangement 212 having gear-elements such as a first sun 214, a first carrier 216, and a first ring 218. The first gearing-arrangement 212 is shown as a simple planetary-gearset and as such the first sun 214 may also be referred to as a first end-gear 214. The first carrier 216 may be referred to as a first interior-gear 216, and the first ring 218 may be referred to as a second end-gear 218.

A second gearing-arrangement 222 is shown as a double-pinion planetary-gearset having gear-elements of a second sun 224, a second carrier 226, and a second ring 228. In this case, the carrier 226 has two sets of planet-gears which are disposed between the sun 224 and the ring 228. Teeth of the first planet set 226a mesh with teeth of the second sun 224 (without contacting the second ring 228), teeth of the second planet set 226b mesh with teeth of the second ring 228 (without contacting the second sun 224), and teeth of both planet sets 226a, 226b mesh with each other. The order of the LSR in this double-pinion planetary-gearset is from the second sun 224 to the second ring 228 to the second carrier 226. As such, the second sun 224 may be referred to as a third end-gear 224, the second ring 228 may be referred to as a second interior-gear 228, and the second carrier 226 may be referred to as a fourth end-gear 226.

A third gearing-arrangement 232 is shown as a simple planetary-gearset having gear-elements such as a third sun 234, a third carrier 236, and a third ring 238. The third sun 234 may be referred to as a fifth end-gear 234, the third carrier 236 may be referred to as a third interior-gear 236, and the third ring 238 may be referred to as a sixth end-gear 238.

A fourth gearing-arrangement 242 is shown as a simple planetary-gearset having gear-elements such as a fourth sun 244, a fourth carrier 246, and a fourth ring 248. The fourth sun 244 may be referred to as a seventh end-gear 244, the fourth carrier 246 may be referred to as a fourth interior-gear 246, and the fourth ring 248 may be referred to as an eighth end-gear 248.

Second transmission 200 has a housing or ground 252 which provides a non-rotating structure that a gear-element or shaft may be fixedly or selectively coupled to. The second sun 224 is shown fixedly coupled to the ground 252. Since the second gearing-arrangement 222 is a double-pinion planetary-gearset, grounding the second sun 224 provides that the any shaft associated with the second carrier 226 will have a speed faster than the a shaft associated with the second ring 228. As mentioned above, however, the shaft speed correlation may be swapped, such that the carrier could be grounded and any shaft associated with the sun would then have a speed faster than the ring. Thus the associated shaft and the ground could be swapped from a sun to a carrier (and the teeth of the gears modified as necessary to maintain the linear speed relationship). As mentioned above, this ability to swap the gear-elements and planetary-gear types provides that broader terminology may be used to define the relationship, in that the second planetary-gearset 222 has an end-gear (e.g. a third end-gear 224) fixedly coupled to a ground 252.

The third ring 238 is shown fixedly coupled to the ground 252. Grounding the third ring 238 provides that the any shaft associated with the third sun 234 will have a speed faster than a shaft associated with the third carrier 236. Said differently, an end-gear of the third gearing-arrangement 232 (e.g. the sixth end-gear 238) is fixedly coupled to the ground.

The second ring 228 is fixedly coupled to the first ring 218. It may also be stated that an interior-gear of the second gearing-arrangement 222 (e.g. the second interior-gear 228) is fixedly coupled to the an end-gear of the first gearing arrangement (e.g. the second end-gear 218). To further the concept of swappable gearing-arrangements, the second end-gear 218 shown here as a ring on a simple planetary-gearset, but it could be a carrier on a double-pinion planetary-gearset, or a sun on either a simple or double-pinion planetary-gearset.

The second carrier 226 is coupled to the third sun 234 and the fourth sun 244. Coupled, as used here, may indicate either fixedly coupled or selectively coupled. In this case, the second carrier 226 is fixedly coupled to the third sun 234 and the fourth sun 244. Also, as with above, this relationship could also be described as an end-gear from the second gearing-arrangement 222 (e.g. the fourth end-gear 226) being coupled with an end-gear of the third gearing-arrangement 232 (e.g. the fifth end-gear 234) and an end-gear of the fourth gearing-arrangement 242 (e.g. the seventh end-gear 244). The end-gear of the third-gearing arrangement 232 coupled to the ground (e.g. the sixth end-gear 238) is the end-gear opposite its other end-gear (e.g. the fifth end-gear 234) that is fixedly coupled with a gear-element of the second gearing-arrangement 222, which happens to be the end-gear of the second gearing-arrangement 222 (e.g. fourth end-gear 226) opposite its other end-gear (e.g. third end-gear 224) which is also fixedly coupled to the ground 252.

An input 262 is coupled to gear-elements of the first planetary-gearset 212 and the fourth planetary-gearset 242. Coupled, as used here, may mean fixedly or selectively coupled. In this figure, the input 262 is selectively coupled to the gear-elements of the first and fourth planetary-gearsets 212, 242. The specific shift-elements and gear-elements are described below.

An output 264 is coupled to a gear-element of the third planetary-gearset 232 and the fourth planetary-gearset 242. In this case, the output 264 is fixedly coupled to a gear-element of the fourth planetary-gearset 242 and selectively coupled to a gear-element of the third planetary-gearset 232. The specific shift-element and gear-element is described below. More specifically, the output 264 is fixedly coupled to the fourth ring 248. Said another way, the output 264 is fixedly coupled to an end-gear of the fourth gearing-arrangement 242 (e.g. the eighth end-gear 248).

A first shift-element 270 selectively couples the first carrier 216 to the input 262. Thus when the first shift-element 270 is engaged, the first carrier 216 spins at substantially the same speed as the input 262. Since the first planetary-gearset 212 is a simple planetary-gearset, the first shift-element 270 may be said to selectively couple the input 262 to an interior-gear of the first gearing-arrangement 212 (e.g. the first interior gear 216).

A second shift-element 274 selectively couples the first sun 214 to the input 262. Thus engagement of the second shift-element 274 causes the first sun 214 to rotate at substantially the same speed as the input 262. Said another way, the second shift-element 274 selectively couples the input 262 to an end-gear of the first gearing-arrangement 212 (e.g. the first end-gear 214). The second shift-element 274 selectively couples the input 262 to an end-gear of the first gearing-arrangement 212 (e.g. the first end-gear 214) which is opposite from its end-gear (e.g. the second end-gear 218) that is fixedly coupled to the interior-gear of the second gearing-arrangement 222 (e.g. the second interior-gear 228).

A third shift-element 278 selectively couples the first carrier 216 to the ground 252. Since the third shift-element 278 selectively couples a shaft to the ground 252, the third shift-element 278 may be referred to as a brake. Stated more broadly, the third shift-element 278 selectively couples an interior-gear of the first gearing-arrangement 212 (e.g. the first interior-gear 216) to the ground 152. Engagement of the third shift-element 278 results in the first carrier 216 remaining stationary and not rotating.

A fourth shift-element 282 selectively couples the first carrier 216 to the second carrier 226. Also, the fourth shift-element 282 may selectively couple the first carrier 216 to other gear elements associated with the third and fourth planetary-gearsets 232, 242. Stated more broadly, the fourth shift-element 282 selectively couples an interior-gear of the first gearing-arrangement 212 (e.g. the first interior-gear 216) to an end-gear of the second gearing-arrangement 222 (e.g. the fourth end-gear 226). In this transmission, the fourth shift-element 282 also selectively couples end-gears from the third and fourth gearing-arrangements 232, 242 (e.g. the fifth and seventh end-gears 234, 244) to the interior gear of the first gearing-arrangement 212 (e.g. the first interior-gear 216) and an end-gear of the second gearing-arrangement 222 (e.g. the fourth end-gear 226) as well. In the second transmission 200, engagement of the fourth shift-element 282 causes the first carrier 216, the second carrier 226, the third sun 234 and the fourth sun 244 to all rotate at substantially the same speed.

A fifth shift-element 284 selectively couples a gear-element of the third planetary-gearset 232 to the output 264. The fifth shift-element 284 selectively couples the third carrier 236 to the output 264. Said a different way, the fifth shift-element 284 selectively couples an interior-gear of the third gearing-arrangement 232 to the output 264. Engagement of the fifth shift-element 284 results in the output 264 rotating slower than the third sun 234. Stated more broadly, the fifth shift-element 284 selectively couples an interior-gear of the third gearing-arrangement 232 (e.g. the third interior-gear 236) to the output 264. Engagement of the fifth shift-element 284 results in the output 264 having a speed faster than the grounded end-gear of the third gearing-arrangement 232 (e.g. the sixth end-gear 238) and slower than its opposite end-gear (e.g. the fifth end-gear 234).

A sixth shift-element 286 selectively couples a gear-element from the fourth planetary-gearset 242 to the input 262. The sixth shift-element 286 selectively couples the fourth carrier 246 to the input 262. Said another way, the sixth shift-element 286 selectively couples an interior-gear of the fourth gearing-arrangement 242 (e.g. the fourth interior-gear 246) to the input 262. Engagement of the sixth shift-element 286 results in the input 264 and the fourth carrier rotating at substantially the same speed.

The second transmission 200 is similar to the first transmission 100. Some differences include the second planetary-gearset swapping from a simple planetary-gearset (e.g. the second planetary-gearset 122 from the first transmission 100) to a double-pinion planetary-gearset (e.g. the second planetary gearset 222 from the second transmission 200). This change is done to showcase that any single planetary-gearset may be swapped between a simple planetary-gearset and a double-pinion planetary-gearset. With this change, however, the end-gears and interior-gears maintain the same associations. In both cases, one end-gear (e.g. the third end gears 124, 224) is grounded, an interior-gear (e.g. second interior gears 126, 228) is fixedly coupled with an end gear from the first gearing arrangement, and an opposite end-gear (e.g. the fourth end-gears 128, 226) are coupled with gear-elements of the third and fourth gearing arrangements.

Another difference includes the fifth shift-element 184, 284 moving from the third ring 138 on the third planetary-gearset 132 of the first transmission 100 to the third carrier 236 on the third planetary-gearset 232 of the second transmission 200. With this change, however, both third rings 138, 238 are coupled with the housing 152, 252, one being selectively coupled and the other being fixedly coupled, respectively. As well, both third carriers 136, 236 are coupled with the output 164, 264, one being fixedly coupled and the other being selectively coupled, respectively.

Yet another difference includes the sixth shift-element 186, 286 moving from the fourth ring 148 on the fourth planetary-gearset 142 of the first transmission 100 to the fourth carrier 246 on the fourth planetary-gearset 242 of the second transmission 200. With this change, however, both fourth rings 148, 248 are coupled with the output 164, 264, one being selectively coupled and the other being fixedly coupled, respectively. As well, both fourth carriers 146, 246 are coupled with the input 162, 262, one being fixedly coupled and the other being selectively coupled, respectively.

The second transmission 200 in its similarity with the first transmission 100 may also follow the same shift schedule as shown in FIG. 2 providing for nine forward speeds and one reverse; however the beta ratios, speed ratios, and steps may be different.

Figure 4:
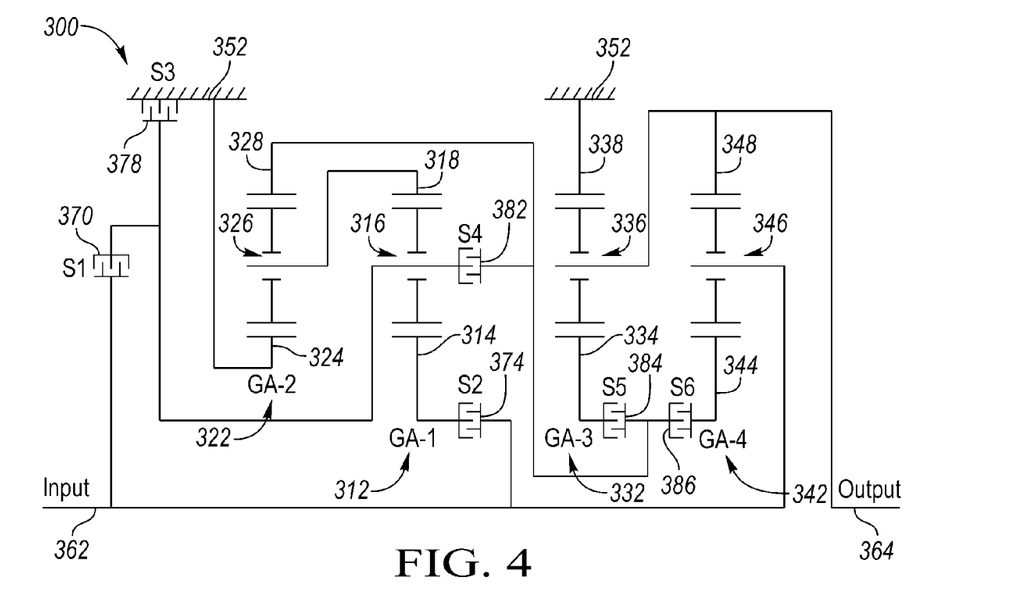
FIG. 4 is a schematic diagram of third transmission.

FIG. 4 shows a schematic diagram of a third transmission 300. Third transmission 300 has a first gearing-arrangement 312 having gear-elements such as a first sun 314, a first carrier 316, and a first ring 318. The first gearing-arrangement 312 is shown as a simple planetary-gearset and as such the first sun 314 may also be referred to as a first end-gear 314. The first carrier 316 may be referred to as a first interior-gear 316, and the first ring 318 may be referred to as a second end-gear 318.

A second gearing-arrangement 322 is shown as a simple planetary-gearset again having gear-elements of a second sun 324, a second carrier 326, and a second ring 328. The second sun 324 may be referred to as a third end-gear 324, the second carrier 326 may be referred to as a second interior-gear 326, and the second ring 328 may be referred to as a fourth end-gear 328.

A third gearing-arrangement 332 is shown as a simple planetary-gearset having gear-elements such as a third sun 334, a third carrier 336, and a third ring 338. The third sun 334 may be referred to as a fifth end-gear 334, the third carrier 336 may be referred to as a third interior-gear 336, and the third ring 338 may be referred to as a sixth end-gear 338.

A fourth gearing-arrangement 342 is shown as a simple planetary-gearset having gear-elements such as a fourth sun 344, a fourth carrier 346, and a fourth ring 348. The fourth sun 344 may be referred to as a seventh end-gear 344, the fourth carrier 346 may be referred to as a fourth interior-gear 346, and the fourth ring 348 may be referred to as an eighth end-gear 348.

Third transmission 300 has a housing or ground 352 which provides a non-rotating structure that a gear-element or shaft may be fixedly or selectively coupled to. The second sun 324 is shown fixedly coupled to the ground 352. Since the second gearing-arrangement 322 is a simple planetary-gearset, grounding the second sun 324 provides that the any shaft associated with the second ring 328 will have a speed faster than the a shaft associated with the second carrier 326. Said another way, the second planetary-gearset 322 has an end-gear (e.g. the third end-gear 324) fixedly coupled to a ground 352, and any shaft associated with its opposite end-gear (e.g. the fourth end-gear 328) will have a faster speed than any shaft associated with its interior-gear (e.g. the second interior-gear 326).

The third ring 338 is also shown fixedly coupled to the ground 352. Grounding the third ring 338 provides that the any shaft associated with the third sun 334 will have a speed faster than a shaft associated with the third carrier 336. Said differently, an end-gear of the third gearing-arrangement 332 (e.g. the sixth end-gear 338) is fixedly coupled to the ground, and any shaft associated with its opposite end-gear (e.g. the fifth end-gear 334) will have a faster speed than any shaft associated with its interior-gear (e.g. the third interior-gear 336).

The second carrier 326 is fixedly coupled to the first ring 318. It may also be stated that an interior-gear of the second gearing-arrangement 322 (e.g. the second interior-gear 326) is fixedly coupled to the an end-gear of the first gearing arrangement 312 (e.g. the second end-gear 318).

The second ring 328 is coupled to the third sun 334 and the fourth sun 344. Coupled, as used here, may indicate either fixedly coupled or selectively coupled. In this case, the second ring 328 is selectively coupled to the third sun 334 and the fourth sun 344. Specific shift-elements and gear-elements are described below. Also, as with above, this relationship could also be described as an end-gear from the second gearing-arrangement 322 (e.g. the fourth end-gear 328) being coupled with end-gears of the third gearing-arrangements 332, 342 (e.g. the fifth and seventh end-gears 234, 244).

An input 362 is coupled to gear-elements of the first planetary-gearset 312 and the fourth planetary-gearset 342. Again, coupled, as used here, may mean fixedly or selectively coupled. In this figure, the input 362 is selectively coupled to the gear-elements of the first planetary-gearset 312, the specific shift-elements and gear-elements being described below, and fixedly coupled to a gear-element of the fourth planetary-gearset 342. The input 362 is fixedly coupled to the fourth carrier 346. Said another way, the input is fixedly coupled an interior-gear of the fourth gearing-arrangement (e.g. the fourth interior-gear 346).

An output 364, is coupled to gear-elements of the third and fourth planetary-gearsets 332, 342. In this case, the output 364 is fixedly coupled to gear-elements of both the third and fourth planetary-gearsets 332, 342. More specifically, the output 364 is fixedly coupled to the third carrier 336 and the fourth ring 348. Said another way, the output 364 is fixedly coupled to an interior-gear of the third gearing-arrangement (e.g. the third interior-gear 336) and an end-gear of the fourth gearing-arrangement 342 (e.g. the eighth end-gear 348).

A first shift-element 370 selectively couples the first carrier 316 to the input 362. Thus when the first shift-element 370 is engaged, the first carrier 316 spins at substantially the same speed as the input 362. Since the first planetary-gearset 312 is a simple planetary-gearset, the first shift-element 370 may be said to selectively couple the input 362 to an interior-gear of the first gearing-arrangement 312 (e.g. the first interior gear 316).

A second shift-element 374 selectively couples the first sun 314 to the input 362. Thus engagement of the second shift-element 374 causes the first sun 314 to rotate at substantially the same speed as the input 362. Said another way, the second shift-element 374 selectively couples the input 362 to an end-gear of the first gearing-arrangement 312 (e.g. the first end-gear 314). The second shift-element 374 selectively couples the input 362 to an end-gear of the first gearing-arrangement 312 (e.g. the first end-gear 314) which is opposite from its end-gear (e.g. the second end-gear 318) that is fixedly coupled to the interior-gear of the second gearing-arrangement 322 (e.g. the second interior-gear 326).

A third shift-element 378 selectively couples the first carrier 316 to the ground 352. Since the third shift-element 378 selectively couples a shaft to the ground 352, the third shift-element 378 may be referred to as a brake. Stated more broadly, the third shift-element 378 selectively couples an interior-gear of the first gearing-arrangement 312 (e.g. the first interior-gear 316) to the ground 352. Engagement of the third shift-element 378 results in the first carrier 316 remaining stationary and not rotating.

A fourth shift-element 382 selectively couples the first carrier 316 to the second ring 328. Stated more broadly, the fourth shift-element 382 selectively couples an interior-gear of the first gearing-arrangement 312 (e.g. the first interior-gear 316) to an end-gear of the second gearing-arrangement 322 (e.g. the fourth end-gear 328), which is the end-gear opposite its other end-gear (e.g. the third end-gear 324) which is a ground.

A fifth shift-element 384 selectively couples a gear-element of the third planetary-gearset 332 to the second ring 328. The fifth shift-element 384 selectively couples the third sun 334 to the second ring 328. Said a different way, the fifth shift-element 384 selectively couples an end-gear of the third gearing-arrangement 332 (e.g. the fifth end-gear 334), which is opposite its end-gear which is a ground (e.g. the sixth end-gear 338) to an end-gear of the second gearing-arrangement (e.g. the fourth end-gear 328), which is opposite its end-gear that is also a ground (e.g. the third end-gear 324).

A sixth shift-element 386 selectively couples a gear-element from the fourth planetary-gearset 342 to the second ring 328. The sixth shift-element 386 selectively couples the fourth sun 344 to the second ring 328. Said another way, the sixth shift-element 386 selectively couples an end-gear of the fourth gearing-arrangement 342 (e.g. the seventh end gear 344), which is opposite its end-gear coupled to the output 364 (e.g. the eighth end-gear 348) to an end-gear of the second gearing-arrangement (e.g. the fourth end-gear 328), which is opposite its end-gear that is a ground (e.g. the third end-gear 324).

The third transmission 300 is similar to the first transmission 100. Some differences include the fifth shift-element 184, 384 moving from the third ring 138 on the third planetary-gearset 132 of the first transmission 100 to the third sun 334 on the third planetary-gearset 332 of the third transmission 300. With this change, however, both third rings 138, 338 are coupled with the housing 152, 352, one being selectively coupled and the other being fixedly coupled, respectively. As well, both third suns 134, 334 are coupled with the second ring 128, 328, one being fixedly coupled and the other being selectively coupled, respectively.

Another difference includes the sixth shift-element 186, 386 moving from the fourth ring 148 on the fourth planetary-gearset 142 of the first transmission 100 to the fourth sun 344 on the fourth planetary-gearset 342 of the third transmission 300. With this change, however, both fourth rings 148, 348 are coupled with the output 164, 364, one being selectively coupled and the other being fixedly coupled, respectively. As well, both fourth suns 144, 344 are coupled with the second rings 128, 328, one being fixedly coupled and the other being selectively coupled, respectively.

The third transmission 300 in its similarity with the first transmission 100 may also follow the same shift schedule as shown in FIG. 2 providing for nine forward speeds and one reverse; however the beta ratios, speed ratios, and steps may be different.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A transmission comprising:
    first thru sixth shift-elements;
    a first planetary-gearset having a first carrier and a first sun selectively coupled to an input by the first and second shift-elements, respectively, and a first ring;
    a second planetary-gearset having a second carrier and a second sun fixedly coupled to the first ring and a housing, respectively, and a second ring; and
    a third and a fourth planetary-gearset each having a gear-element coupled to the second ring.

2. The transmission of claim 1 wherein the third shift-element selectively couples the first carrier to the housing.

3. The transmission of claim 1 wherein the fourth shift-element selectively couples the first carrier to the second ring.

4. The transmission of claim 1 wherein the gear-element of the third planetary-gearset coupled to the second ring is a third sun, and the third planetary-gearset has a third carrier coupled to an output, and a third ring coupled to the housing.

5. The transmission of claim 4 wherein the third sun is fixedly coupled to the second ring, the third carrier is fixedly coupled to the output, and the fifth shift-element selectively couples the third ring to the housing.

6. The transmission of claim 1 wherein the gear-element of the fourth planetary-gearset coupled to the second ring is a fourth sun, and the fourth planetary-gearset has a fourth carrier coupled to the input, and a fourth ring coupled to the output.

7. The transmission of claim 6 wherein the fourth sun is fixedly coupled to the second ring, the fourth carrier is fixedly coupled to the input, and the sixth shift-element selectively couples the fourth ring to the output.

8. A transmission comprising:
- a first planetary-gearset having a first interior-gear selectively coupled to an input and selectively coupled to a housing, a first end-gear selectively coupled to the input, and a second end-gear; and
- a second planetary-gearset having a second interior-gear fixedly coupled to the second end-gear, a third end-gear fixedly coupled to the housing, and a fourth end-gear selectively coupled to the first interior-gear.

9. The transmission of claim 8 wherein the first interior-gear is a first carrier,
- the first end-gear is a first sun, and the second end-gear is a first ring.

10. The transmission of claim 8 wherein the second interior-gear is a second carrier, the third end-gear is a second sun, and the fourth end-gear is a second ring.

11. The transmission of claim 8 further comprising a third planetary-gearset having a fifth-end gear coupled to the fourth end-gear.

12. The transmission of claim 11 wherein the fifth end-gear is a third sun fixedly coupled to the fourth end-gear.

13. The transmission of claim 11 wherein the third planetary-gearset has a third interior-gear coupled to an output.

14. The transmission of claim 13 wherein the third interior-gear is a third carrier fixedly coupled to the output.

15. The transmission of claim 13 wherein the third planetary-gearset has a sixth end-gear coupled to the housing.

16. The transmission of claim 15 wherein the sixth end-gear is a third ring selectively coupled to the housing.

17. The transmission of claim 11 further comprising a fourth planetary-gearset having a seventh end-gear coupled to the fourth end-gear.

18. The transmission of claim 17 wherein the seventh end-gear is a fourth sun fixedly coupled to the fourth end-gear.

19. The transmission of claim 17 wherein the fourth planetary-gearset has a fourth interior-gear coupled to the input.

20. The transmission of claim 19 wherein the fourth interior-gear is a fourth carrier fixedly coupled to the input.

21. The transmission of claim 19 where the fourth planetary-gearset has an eighth end-gear coupled to the output.

22. The transmission of claim 21 wherein the eighth end-gear is a fourth ring selectively coupled to the output.

* * * * *